Dec. 13, 1927.

C. D. DALLAS 1,652,396

METHOD OF AND MACHINE FOR MAKING TUBING

Filed Oct. 21, 1922     11 Sheets-Sheet 1

Witnesses

Inventor:
Charles D. Dallas
By    Atty.

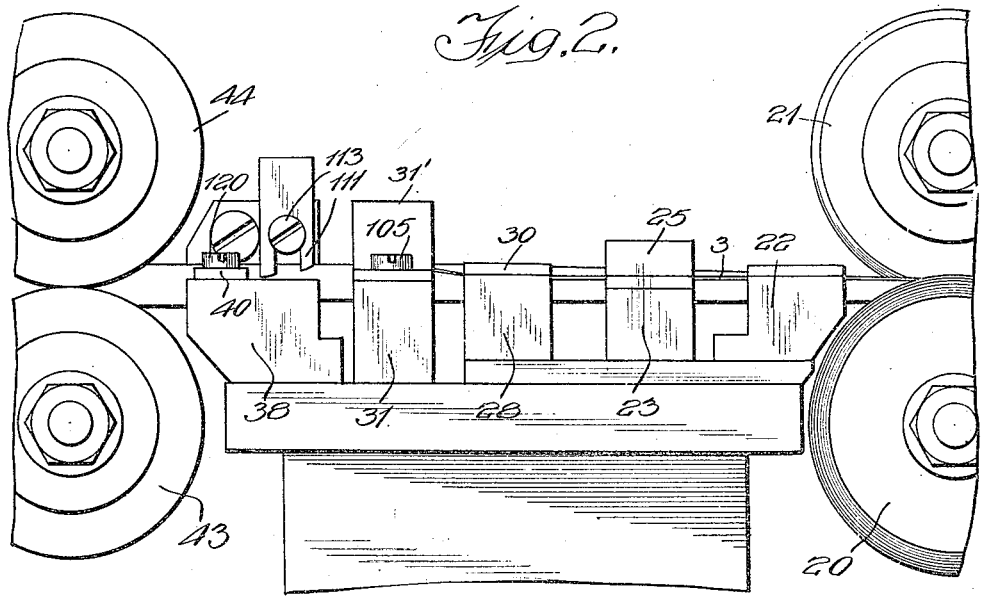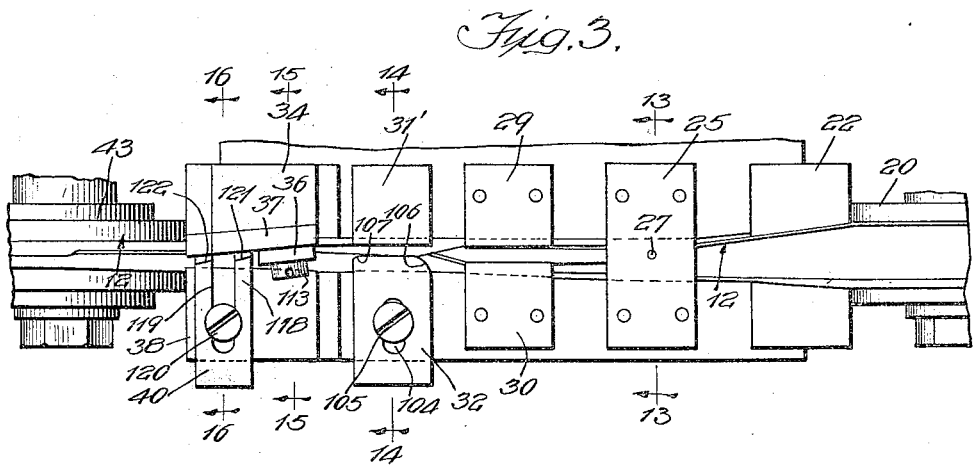

Dec. 13, 1927.  
C. D. DALLAS  
1,652,396  
METHOD OF AND MACHINE FOR MAKING TUBING  
Filed Oct. 21, 1922  
11 Sheets-Sheet 3

Witnesses:
W. P. Kilroy
Harry W. L. White

Inventor:
Charles D. Dallas
By Hill & Hill Attys.

Dec. 13, 1927.
C. D. DALLAS
1,652,396
METHOD OF AND MACHINE FOR MAKING TUBING
Filed Oct. 21, 1922   11 Sheets-Sheet 4
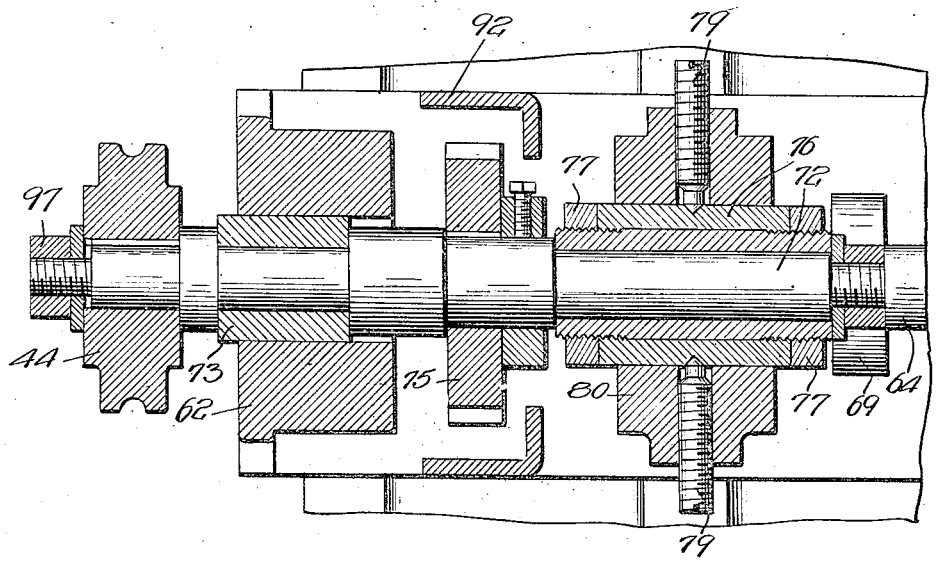
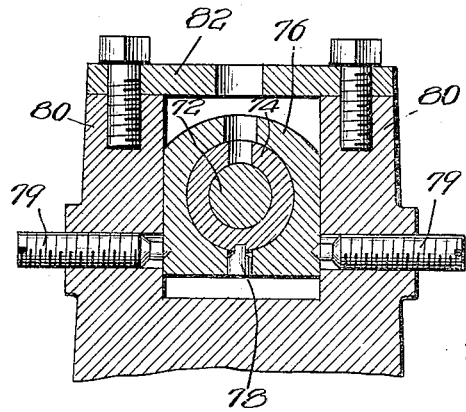
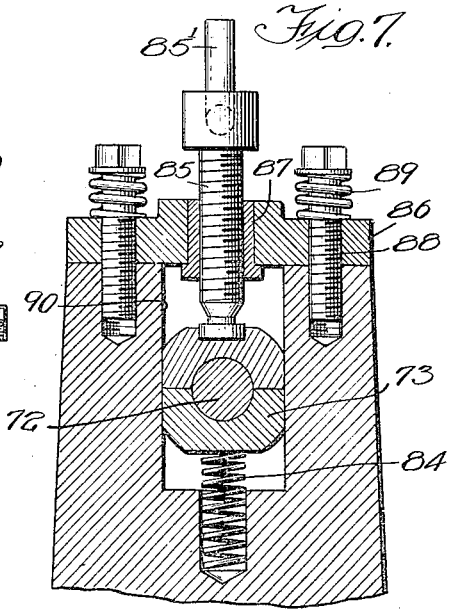

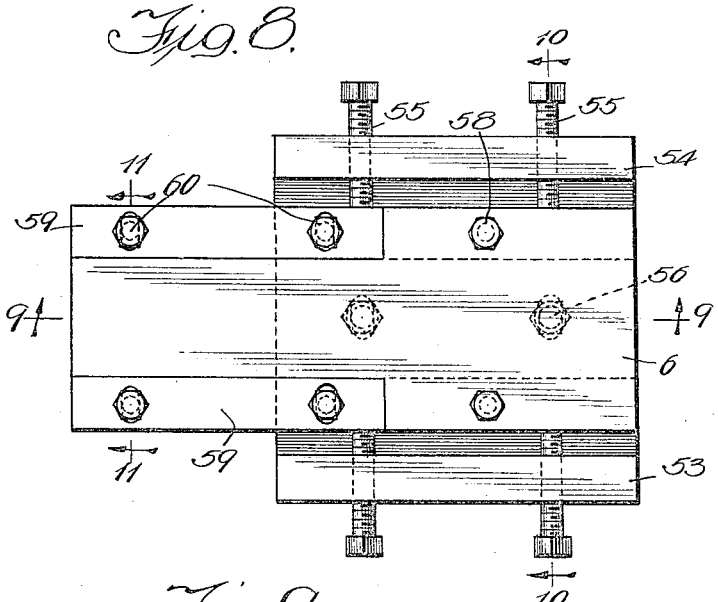
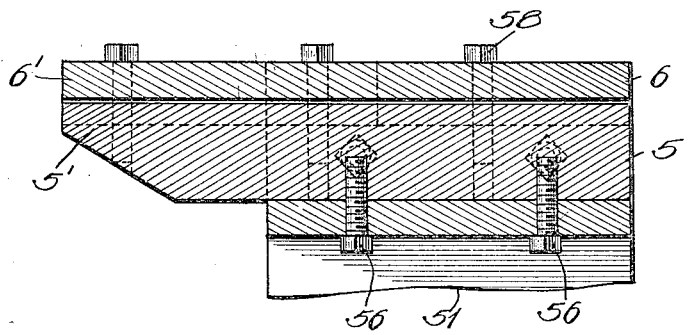
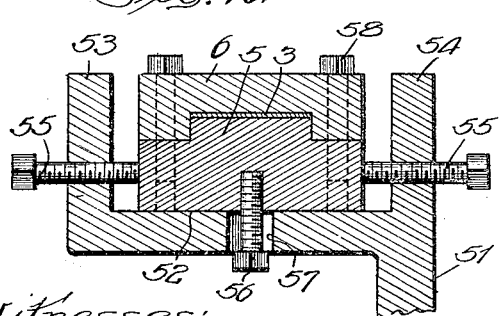
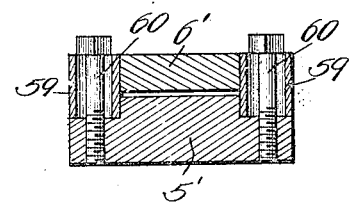

Dec. 13, 1927.

C. D. DALLAS 1,652,396

METHOD OF AND MACHINE FOR MAKING TUBING

Filed Oct. 21, 1922     11 Sheets-Sheet 6

Witnesses:
W. F. Kilroy
Harry R. L. White

Inventor:
Charles D. Dallas
By Hill & Hill Attys.

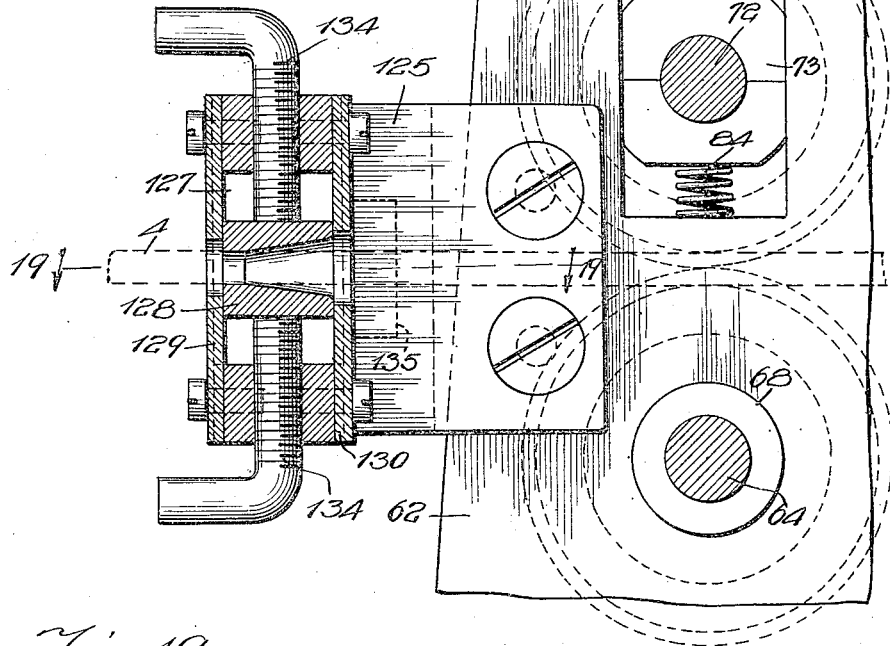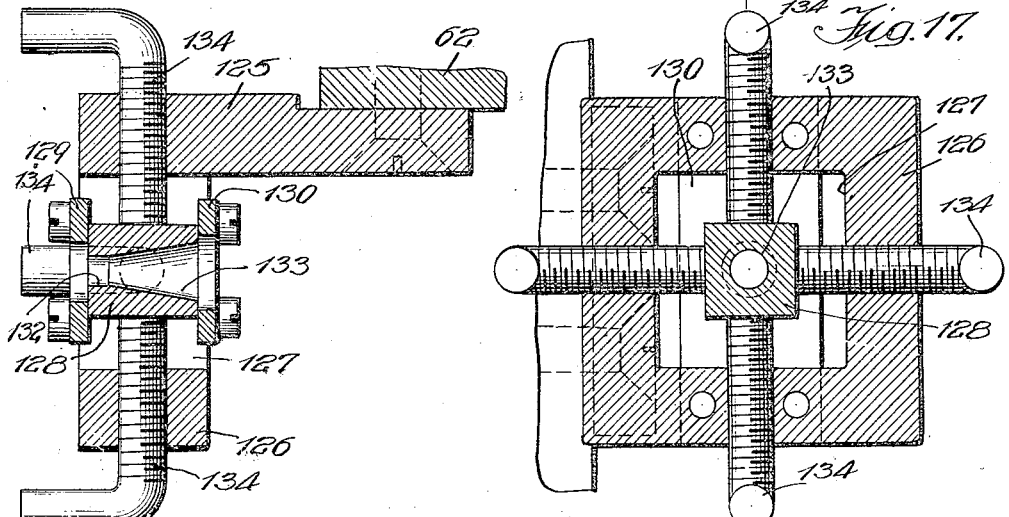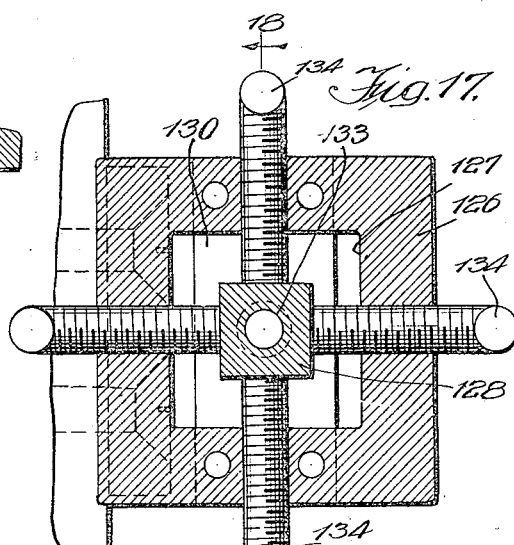

Dec. 13, 1927.
C. D. DALLAS
1,652,396
METHOD OF AND MACHINE FOR MAKING TUBING
Filed Oct. 21, 1922 11 Sheets-Sheet 8
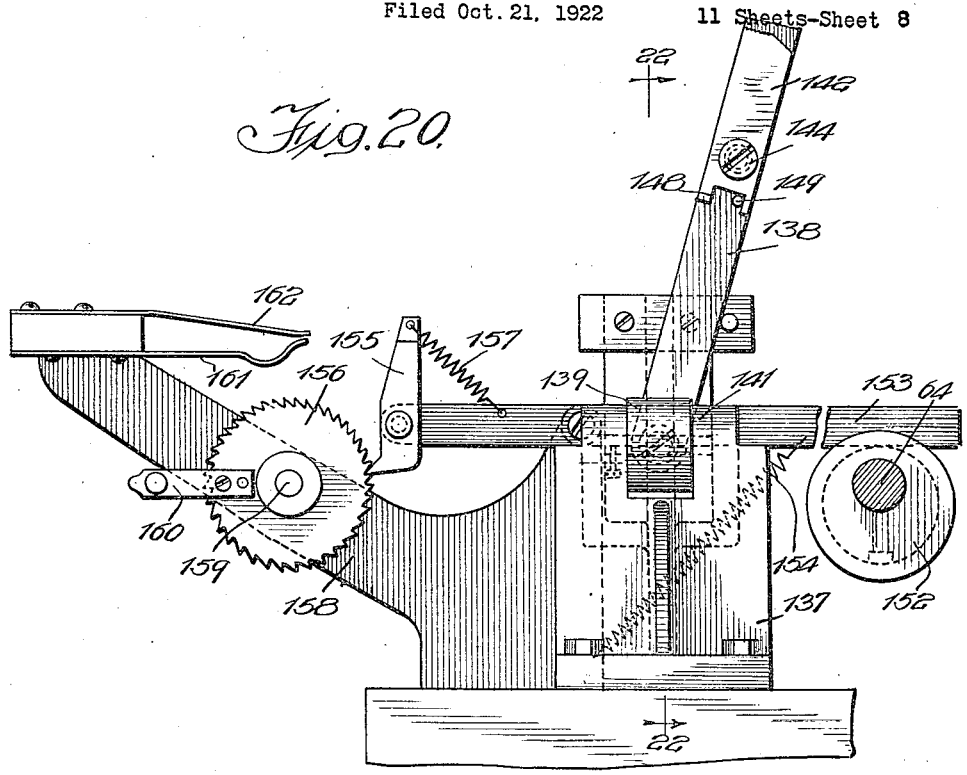
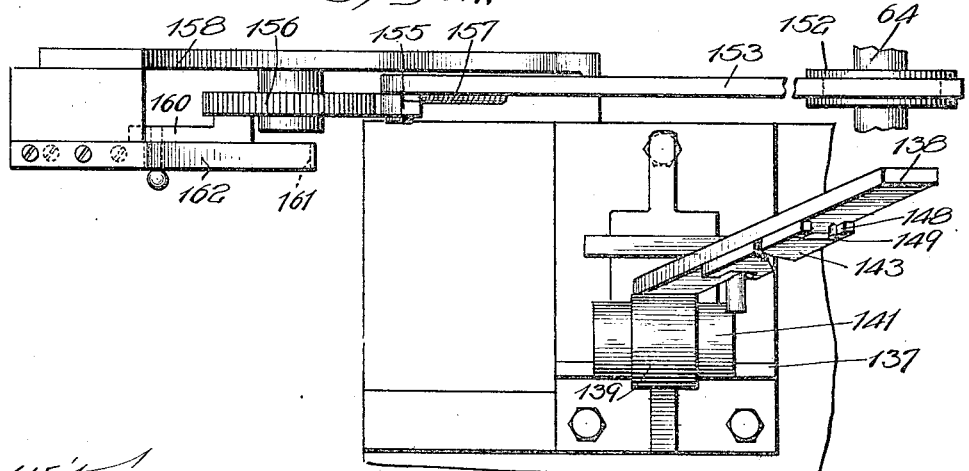

Dec. 13, 1927.
C. D. DALLAS
1,652,396
METHOD OF AND MACHINE FOR MAKING TUBING
Filed Oct. 21, 1922
11 Sheets-Sheet 9
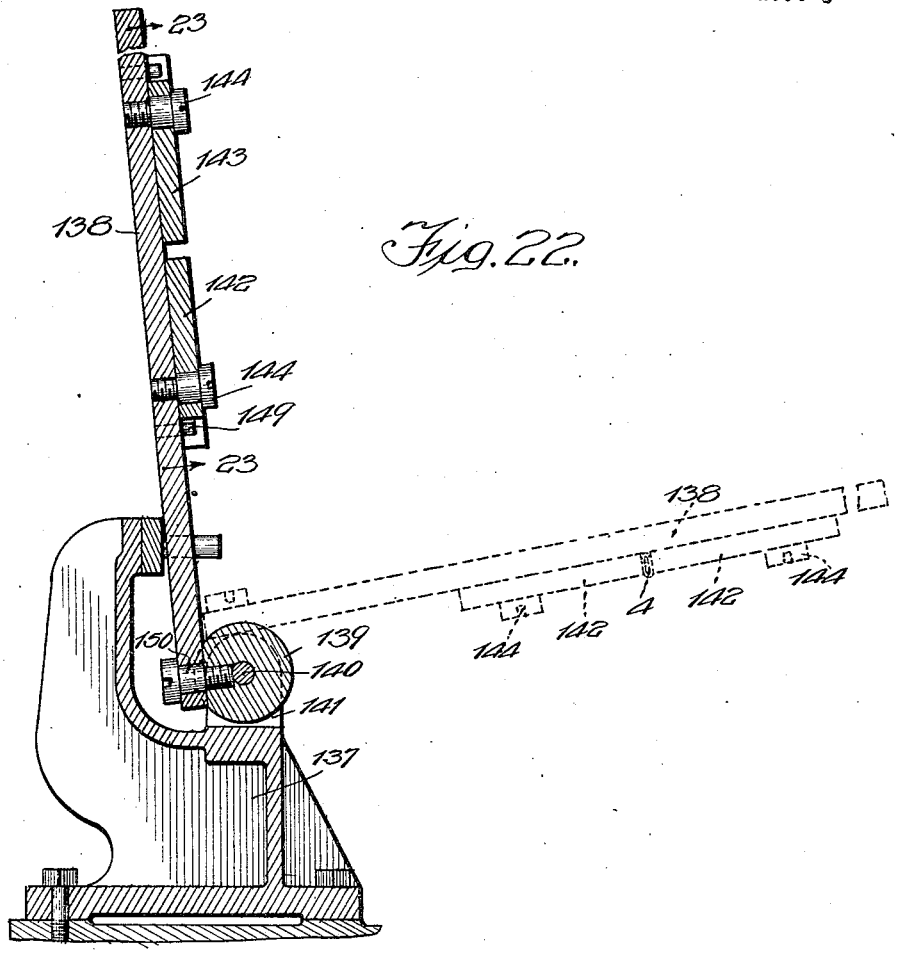
Fig. 22.
Fig. 23.
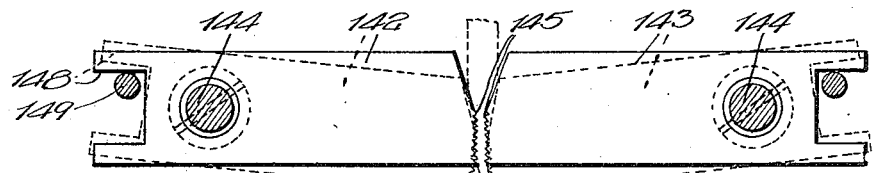
Witnesses:
W. L. Kilroy
Harry R. L. White
Inventor:
Charles D. Dallas
By Hill & Hill
Attys.

Dec. 13, 1927.
C. D. DALLAS
1,652,396
METHOD OF AND MACHINE FOR MAKING TUBING
Filed Oct. 21, 1922    11 Sheets-Sheet 10
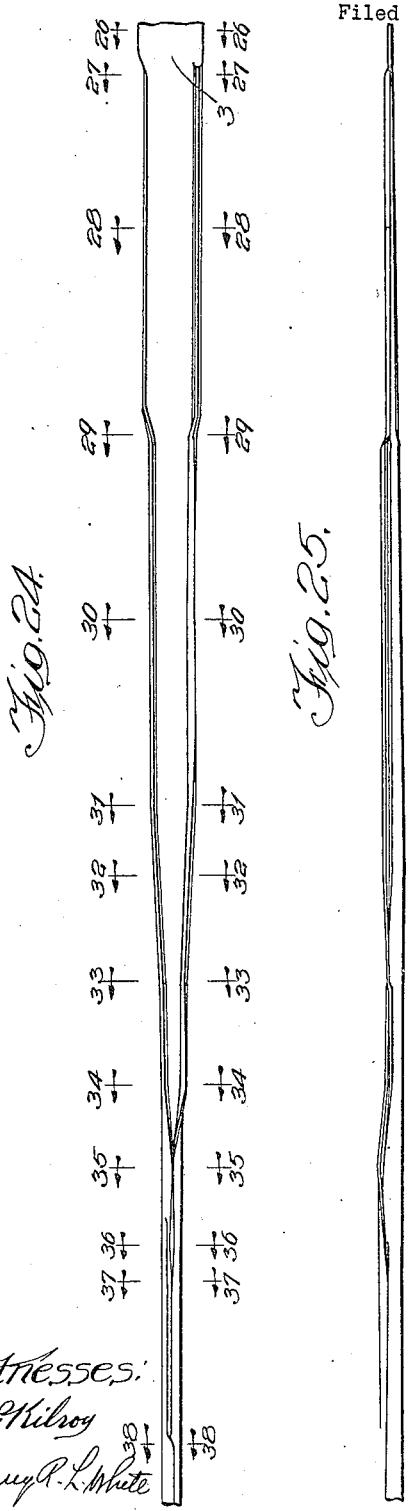
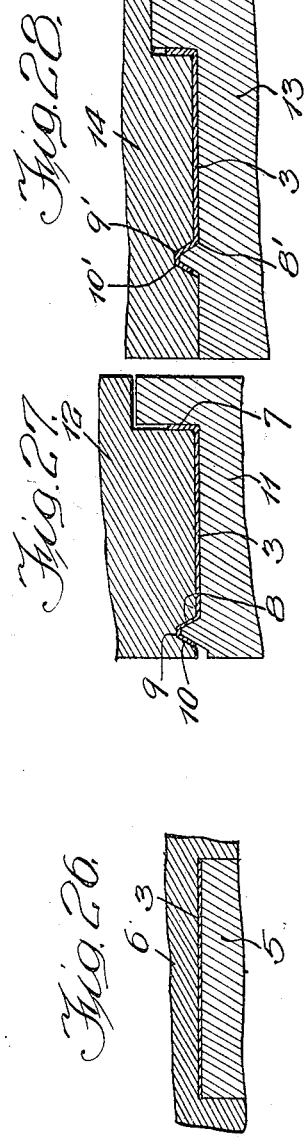
Inventor:
Charles D. Dallas Dec. 13, 1927.
C. D. DALLAS
1,652,396
METHOD OF AND MACHINE FOR MAKING TUBING
Filed Oct. 21, 1922     11 Sheets-Sheet 11
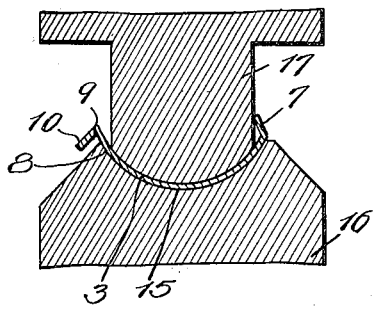
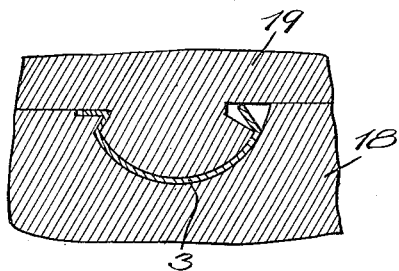
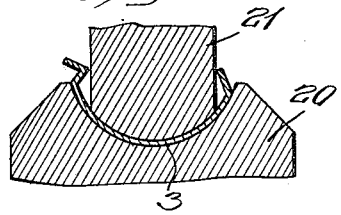
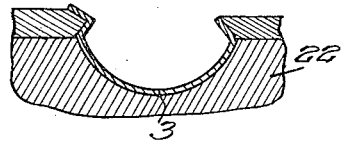
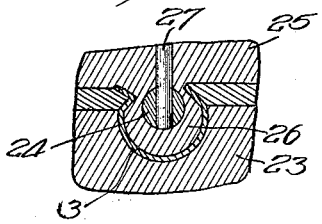
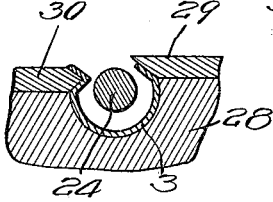
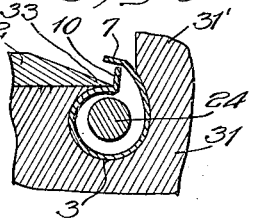
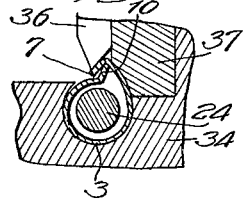
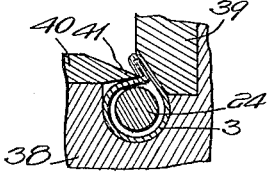
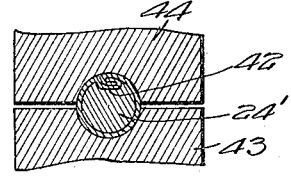
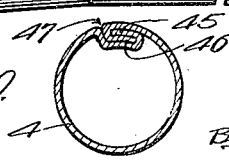
Witnesses:
W. F. Kilroy
Harry A. L. White
Inventor:
Charles D. Dallas
By Niel & Niel Attys Patented Dec. 13, 1927.

1,652,396

UNITED STATES PATENT OFFICE.

CHARLES D. DALLAS, OF WINNETKA, ILLINOIS.

METHOD OF AND MACHINE FOR MAKING TUBING.

Application filed October 21, 1922. Serial No. 595,997.

My invention relates to the art of forming tubes from sheets, preferably strips, of material such as metal. It has among its objects an improved method of manufacturing tubing. It has among its further objects the production of a machine or apparatus for manufacturing tubing and carrying out the improved method, which machine is simple, compact, durable, rapid in operation, efficient and satisfactory. More particularly it has as an object an improvement in the art of tube making which will enable sheet metal tubing to be manufactured in comparatively long lengths, which may be afterward severed, and in desired sizes, shapes, and of suitable materials. Many other objects and advantages of the construction herein shown and described will be obvious to those skilled in the art from the disclosures herein given.

To this end, my invention consists in the novel construction, arrangement and combination of parts herein shown and described, and more particularly pointed out in the claims.

In the drawings, wherein like reference characters indicate like or corresponding parts, Fig. 1 is a side elevation of my improved tube-forming machine;

Fig. 2 is a similar view of a portion of the same, enlarged to more clearly show the construction;

Fig. 3 is a top plan view of a portion of the machine shown in Fig. 2;

Fig. 5 is a sectional view taken substantially on line 5—5 of Fig. 4;

Fig. 6 is a sectional view taken substantially on line 6—6 of Fig. 4;

Fig. 7 is a sectional view taken substantially on line 7—7 of Fig. 4;

Fig. 8 is a plan view of a portion of one end of the machine, as shown at the right of Fig. 1;

Fig. 9 is a sectional view taken substantially on line 9—9 of Fig. 8;

Fig. 10 is a sectional view taken substantially on line 10—10 of Fig. 8;

Fig. 11 is a sectional view taken substantially on line 11—11 of Fig. 8;

Fig. 17 is a sectional view taken substantially on line 17—17 of Fig. 1;

Fig. 18 is a sectional view taken substantially on line 18—18 of Fig. 17;

Fig. 19 is a sectional view taken substantially on line 19—19 of Figs. 1 and 18;

Fig. 20 is an enlarged view of a portion of the machine, as shown in Fig. 1;

Fig. 21 is a top plan view of the same;

Fig. 22 is a sectional view taken substantially on line 22—22 of Fig. 20;

Fig. 23 is a sectional view taken substantially on line 23—23 of Fig. 22;

Fig. 24 is a plan view of a portion of the tube, illustrating steps in the forming thereof;

Fig. 25 is a side elevation of the same;

Fig. 26 is a sectional view taken substantially on line 26—26 of Fig. 24;

Fig. 27 is a sectional view taken substantially on line 27—27 of Fig. 1, the section through the tube substantially corresponding to the section at 27—27 of Fig. 24;

Fig. 28 is a sectional view taken substantially on line 28—28 of Fig. 1, the section through the tube substantially corresponding to the section at 28—28 of Fig. 24;

Fig. 29 is a sectional view taken substantially on line 29—29 of Fig. 1, the section through the tube substantially corresponding to the section at 29—29 of Fig. 24;

Fig. 30 is a sectional view taken substantially on line 30—30 of Fig. 1, the section through the tube substantially corresponding to the section at 30—30 of Fig. 24;

Fig. 31 is a sectional view taken substantially on line 31—31 of Fig. 1, the section through the tube substantially corresponding to the section at 31—31 of Fig. 24;

Fig. 32 is a sectional view taken substantially on line 32—32 of Fig. 1, the section through the tube substantially corresponding to the section at 32—32 of Fig. 24;

Fig. 33 is a sectional view taken substantially on line 33—33 of Fig. 1, the section through the tube substantially corresponding to the section 33—33 of Fig. 24;

Fig. 34 is a sectional view taken substantially on line 34—34 of Fig. 1, the section through the tube substantially corresponding to the section 34—34 of Fig. 24;

Fig. 35 is a sectional view taken substantially on line 35—35 of Fig. 1, the section through the tube substantially corresponding to the section 35—35 of Fig. 24;

Fig. 36 is a sectional view taken substantially on line 36—36 of Fig. 1, the section through the tube substantially corresponding to the section 36—36 of Fig. 24;

Fig. 37 is a sectional view taken substantially on line 37—37 of Fig. 1, the section through the tube substantially corresponding to the section 37—37 of Fig. 24;

Fig. 38 is a sectional view taken substantially on line 38—38 of Fig. 24;

Fig. 39 is a view in elevation of a portion of the mandrel; and

Fig. 40 is a cross-sectional view of the completed tube.

Figure 1:
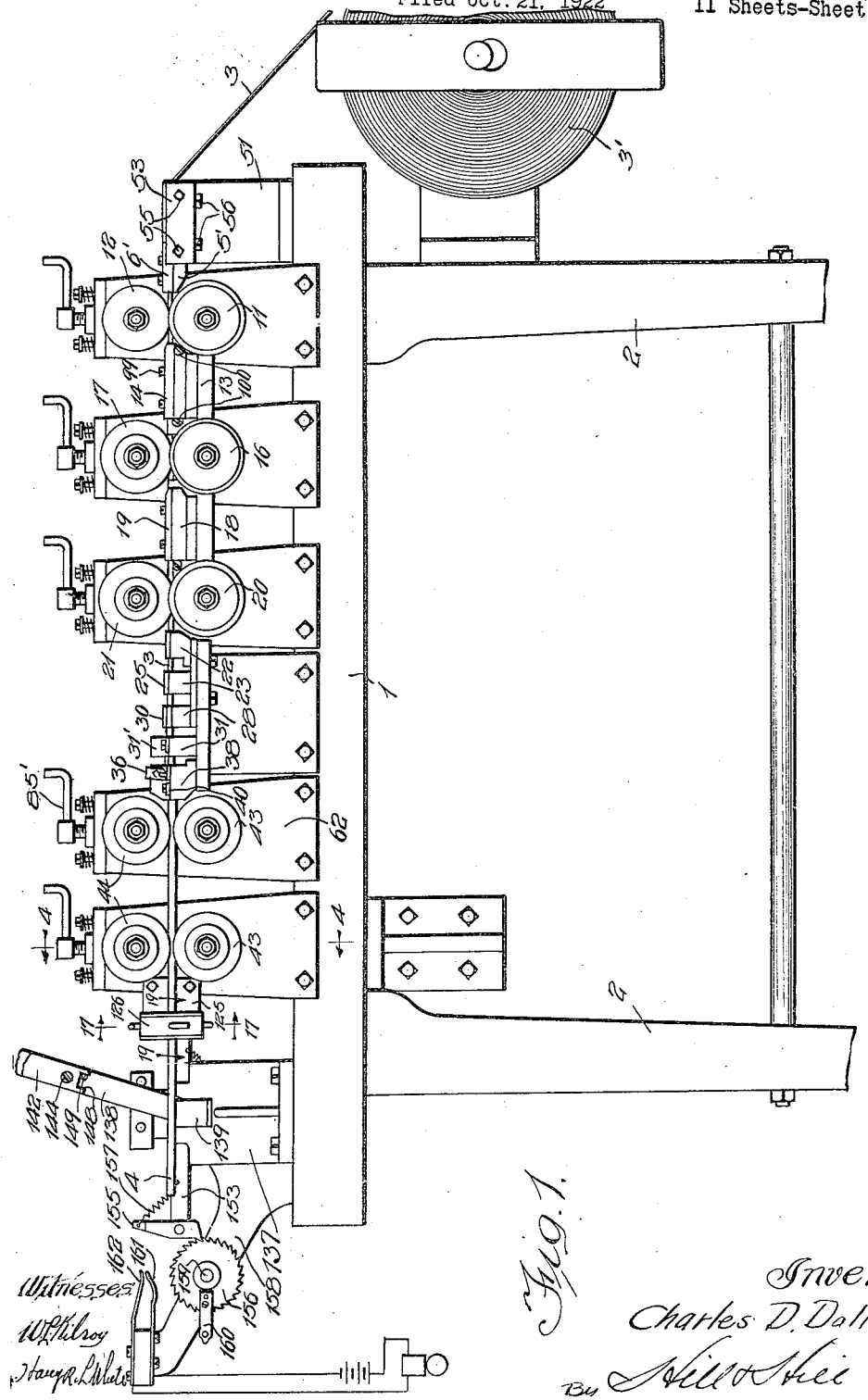

The present invention particularly relates to a method and machine for making tubing, particularly that type of tubing formed from a strip of metal and provided with a lock-seam joint, so that the tube is to all intents and purposes the same as a drawn tube and practically leak-proof. It relates more particularly to the manufacture and mechanism for carrying out the method, in which tubes may be made in practically unlimited length and at high speed, whereby one machine is capable of making a great quantity in continuous operation. For convenience in handling, the tubes are usually first cut in desired lengths and thence later cut into shorter lengths as may be desired. The machine illustrated is particularly adapted for carrying out the forming of the tube with a minimum of wear on the machine and without waste of material.

It may be mentioned that in Figs. 24 and 25 I have illustrated the method of forming the tube from the strip to the point where it is in tubular form and in Figs. 26 to 38 I have shown a portion of the steps at the various points, intermediate steps being obvious. In Fig. 40 a completed tube is shown, in which the strip of material 4 has been completely formed, with a lock-seam, leak-proof joint. While a round tube is shown, any shape tube may be constructed in substantially the manner set forth.

Referring first to those figures before describing the machine in detail suitable for carrying out the various steps, the material 3 is in the form of strips and may be drawn from a roll 3' (see Fig. 1) containing any desired or an unlimited length of material, the same being cut to the desired width and being of the desired gauge or thickness, this depending upon the particular kind and size of the tube which is to be produced. First, I straighten out or iron out the material and get it in proper alignment for the next step, this being done, for example, by passing the same between guides 5 and 6, (Fig. 26) after which the same is preferably formed at the edges, as indicated at 7 on one side and 8, 9 and 10 on the other, (Fig. 27) and this may be done by passing the same through rolls 11 and 12 or the equivalent. This forms initial lines of bend, and while the same may to some extent in the succeeding steps be varied, yet nevertheless the preliminary line of bend will substantially be the bend in the completed product.

After forming the edges, the same is thence formed intermediate the edges, the same being guided, for example, on rolls 16 and 17 (see Fig. 29) by guides 13 and 14 (see Fig. 28), which also tend to keep the material straight and smoothed out. The same then is further formed, as indicated in Fig. 30, for example, by passing the same through rolls 18 and 19, and again it is guided and preferably further formed by passing through guides 20 and 21, shown in Fig. 31. Not only do the guides serve as aligning guides and forming means, but it may be mentioned that the rolls referred to are preferably arranged to feed the material itself therethrough. Consequently, the guides stiffen the material between the rolls and prevent its crumpling up, or buckling, bending or becoming deflected. The same is then further formed, as indicated in Fig. 32, and thence the edges brought further together, and at this step I prefer to interpose a mandrel into the tube, for example, referring to Fig. 33, 24 represents a mandrel which is suitably carried. In the particular machine shown the mandrel 24 is carried by a plate 25 having a forming portion 26 projecting into the tube and cooperating with the forming plate 23.

After the tube is advanced onto the mandrel, the edges are then further formed, as indicated in Fig. 34, and thereafter the edge 10 of the sheet of material is tucked under the extending edge 7 at the strip, as most clearly shown in Fig. 35, in which 32 represents a finger for tucking the same thereunder. The edge 10 having been tucked under the opposite extreme edge 7, I then turn down the edge 7, as most clearly shown in Fig. 36. This may be done by a finger 36 or its equivalent. In the next step I prefer to straighten up the projecting parts, as shown in Fig. 37, and bend in the part 7 of the sheet so that the edge 10 is embraced between the sheet and the edge 7, a finger 40 being provided for this purpose in the machine illustrated.

Having thus initially formed the seam, I then bend down the extending part. In the machine illustrated this is done by passing the same through one or more rollers corresponding to 43 and 44, (Fig. 38) the mandrel at this point being preferably larger, as indicated at 24', and provided with a groove 42. Considerable pressure may be applied, affording a tight, leak-proof joint, as shown in Fig. 40, in which the completed tube 4 is provided with a seam, the portion 46 corresponding with the previous edge 7 being tucked in between the edge 45, corresponding with the previous edge 10, and the portion 47 corresponding with the portion 8.

By carrying out the steps in the manner indicated and providing the machine hereinafter described to carry out these steps, it is found that the material may be fed through the machine at a high rate of speed, producing a uniform product both in size and shape. By constructing the tubing in this manner the same may be very conveniently handled and as powerful a feed employed as desired, as the material itself may be firmly gripped between the rollers and with all the power or friction necessary to feed the same over the mandrel and through the final rolls or other forming means. This may be done without injury to the material or danger of tube crumpling or jamming in the machine.

Referring particularly to Figures 8 to 11, the material is fed to the guide previously referred to, which in the construction shown is supported on a bracket 51 carried by the frame 1 of the machine. (Figs. 1 and 8). The guide consists of the cooperative parts 5 and 6 and these are adjustably supported so that their position may be varied to cause the material to feed properly into the forming mechanism. The part 5 is provided with a projecting portion 5', and secured to the face 52 of the bracket 51 (Fig. 10) by means of bolts or screws 56, or their equivalent, which may pass through slots 57. As shown, the bracket is provided with the flanges 53 and 54 between which the block 5 is mounted, transverse adjustment being provided by means of the bolts 55, these permitting a substantially fine adjustment of the block 5 and cooperate with the bolts 56 holding the same firmly in place. The top part 6 is secured in place to the block 5 by bolts 58 or their equivalents.

Referring particularly to Figure 10 it will be noted that the part 6 engages at either side at the upper portion of the block 5. At the discharge end of the guide, however, I prefer to provide renewable pieces 59 (Figs. 7 and 11) which may be secured to the block 5 by bolts 60 or their equivalents. These parts have a slight transverse adjustment as will be seen by referring to Figures 8 and 11, and as they become worn from time to time, due to possible cutting, due to the edges of the strip 3 passing therethrough, they may be renewed without renewing the entire guide. Shifting the guide or adjusting its position, or adjusting the parts 59, permits the material to be fed to the rolls 11 and 12 (Fig. 1) in a proper manner so as to accurately form the strip. Another advantage in making the parts 59 renewable or separate from the main portion 6 is that they may be hardened and as they wear they may be reground or refaced and moved inwardly so as to perform their functions.

The forming rolls and the method of mounting and driving the same in the particular machine illustrated are all substantially similar and therefore a description of one mounting and driving mechanism will suffice for all. I have illustrated in Figures 4 to 7 the mounting for the forming rolls 43 and 44. Referring to these Figures, a head 62 is mounted on the frame 1 and secured thereto by suitable bolts 63, only a portion of the same being shown, it being understood that the opposite side of the head may be secured to the machine in a similar or equivalent manner. The head carries a driving shaft 64, driven in any suitable manner, the several shafts 64 preferably being driven in unison either by gearing, sprocket chains or the like. The particular shaft shown is mounted in bushings 65 and 66 which may be renewed from time to time as worn, 69 representing a collar for securing the same against displacement toward the front of the machine. As shown, shaft 64 is arranged to drive the driven shaft 72 which carries and drives the forming roll 44. The connecting driving mechanism illustrated consists of the two gears 67 and 75 arranged to mesh so that the forming rolls are driven together but in opposite directions. Shaft 72 is mounted in bushings 73 and 74 and is preferably so mounted that it may be adjusted and at the same time will also yield in case of emergency.

Figure 4:
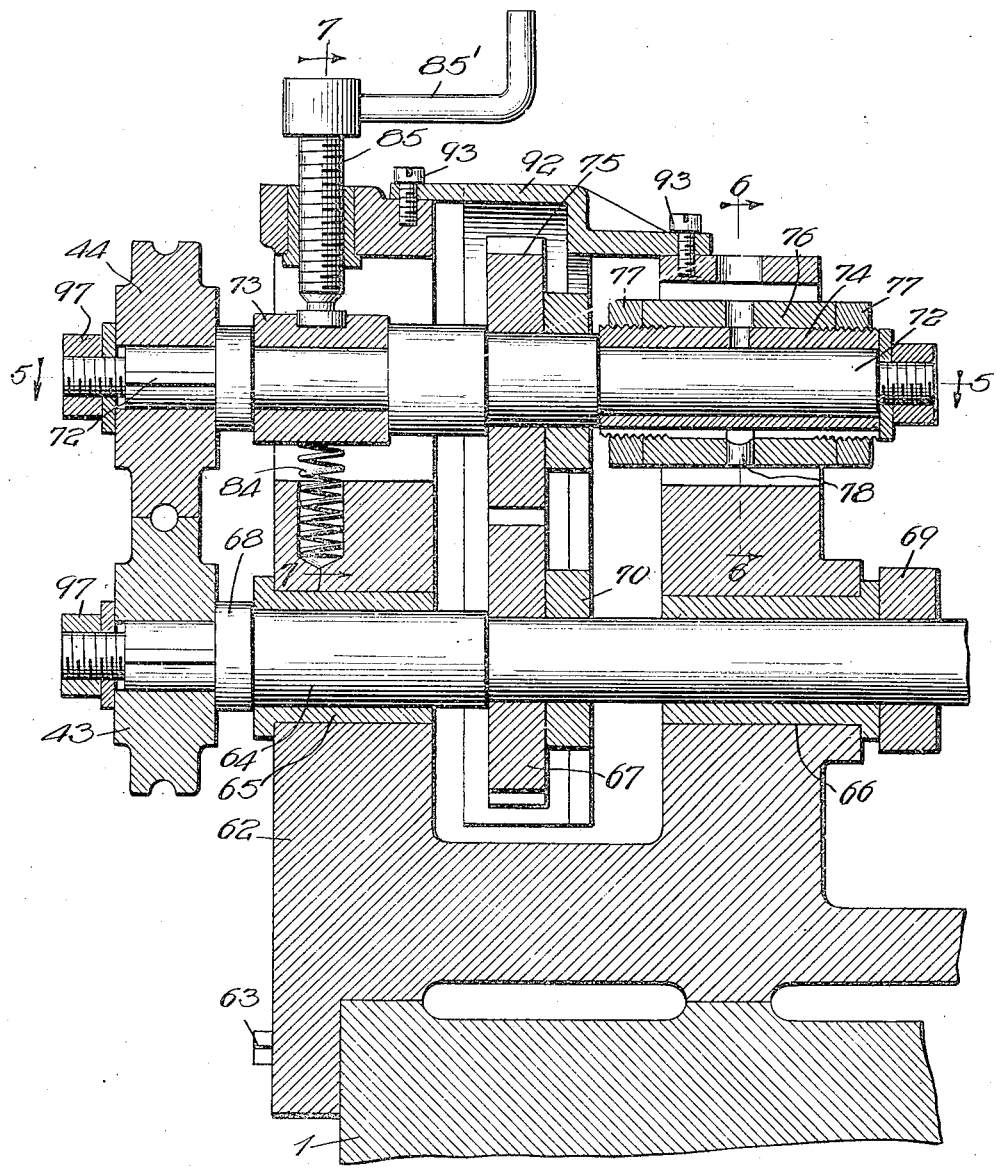
Fig. 4 is a sectional view taken substantially on line 4—4 of Fig. 1.

Referring particularly to Figures 4 and 6, as well as Figure 5, bushing 74 is mounted in an adjustable bearing plug 76, being maintained therein by the nut 77, or the equivalent. The bushing is prevented from rotating in the bearing 76 by a key or pin 78 or equivalent means. As shown, the frame 62 is provided with spaced extending parts 80 (Figs. 6 and 7) between which or in the space, is arranged the member 76, the same being adjustably supported therein by the studs 79, (Figs. 5 and 6) or the like. This construction permits a transverse movement of the shaft 72 so that relative adjustment of the rolls may be varied as desired. I have shown a plate or cover 82 arranged over the bearings. The bearing 73 at the opposite end of the shaft or forming roll end is mounted in a space 90 (Figs. 4 and 7) between the two extending parts of the head 62 (Fig. 5) and is controlled in the construction shown by means of the screw 85 and supporting spring 84. Obviously turning the screw or stud 85 by means of the wrench 85' or the equivalent will depress the bearing 73 or permit its movement in the opposite direction under the pressure of the spring. The stud or screw 85, as shown, passes through a bushing 87 carried by a plate 86. The plate is secured on the head by screws 88 or equivalent means, springs 89 being preferably employed so that in case the machine jams for any reason the rolls may separate owing to the upward movement of the end of the shaft 72. Normally the springs 89 however are strong enough so that in the normal running of the machine the shaft 72 is maintained as rigid as if it were in a rigid bearing. Likewise it should be noted that should the spring 89 not yield enough, bolts 88 may be so designed that they may be fractured without injury to the machine. I have shown a plate 92 arranged and enclosing the gearing 75—67, this cover plate being secured in place to the head part 86 by the studs or screws 93 or the equivalent. The forming rolls may be maintained on the shaft 64 and 72 in any suitable manner. For purposes of illustration I have shown nuts 97, as these have been very satisfactory for the purpose. Keys, bushings and equivalent means may also be employed as desired.

Figure 12:
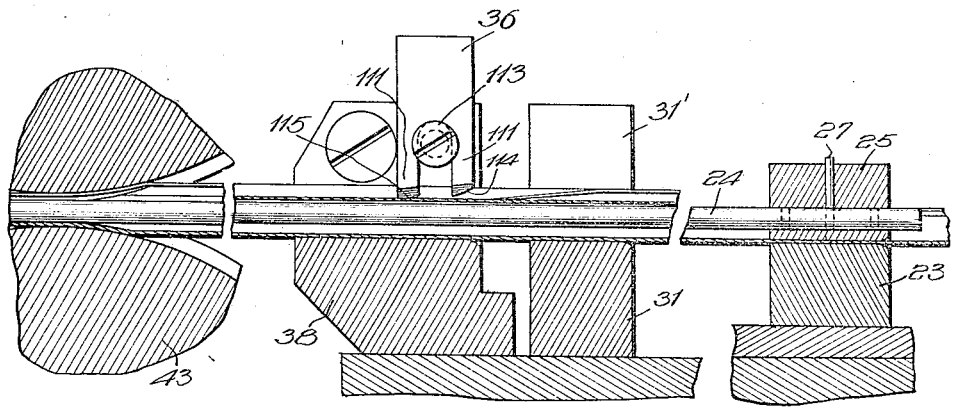
Fig. 12 is a sectional view taken substantially on line 12—12 of Fig. 3.
Figure 13:
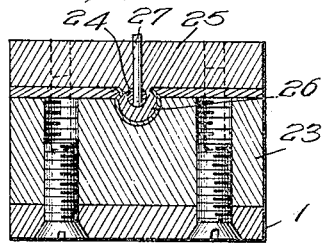
Fig. 13 is a sectional view taken substantially on line 13—13 of Fig. 3.

The guide and forming head or member 22 is shown in detail in Figures 2, 3 and 32, the same tending to turn the sides over and up so that the same will fit into the die 23 which carries the mandrel 24. As shown in Figures 3 and 33, die 23 is shaped to receive the partially formed tube and is provided with a plate 25 secured thereto having a part 26 projecting into the tube and cooperating with 23 to form the same. The projecting part 26 provides an anchor for the mandrel 24, the mandrel being secured thereto by a pin 27 or the equivalent. As shown in Fig. 39 a plurality of holes are provided for the pin 27 so that the mandrel may be adjusted for taking up wear, etc. The mandrel is shown in Figures 12 and 39 and consists of a rod of the desired length which is preferably enlarged with a taper as indicated at 24', 48 being an extension which may be renewed from time to time as the same is worn. The extending part 24' and part 48 are formed with a groove 48' which is arranged to receive the bead or seam, as shown in Figure 40, as the tube is fed through the one or both sets of rolls 43—44. While there may be some slight feeding action of these rolls on the tube their main function is to finish the seam, the feeding being done by the preceding rolls. After leaving the die 25 the tube passes through the die 28 which is provided with the plates 29 and 30 tending to further form the same at the edges as the same passes to the die 31. Arranged to cooperate with the die 31 which is provided with an extending part 31' is a finger 32, best shown in Figures 3, 14 and 35, this finger engaging the edge 10 and cooperating with the die to force the edge under the edge 7 of the tube feeding, the finger being preferably brought to an edge, as indicated at 33, with the corners slightly rounded or formed as indicated at 106 and 107 (Fig. 3). The finger is maintained in place by a screw 105 or the equivalent; 104 being a slot in the finger so that it may be adjusted to secure the desired results.

It will be noted that the die portion 31' is formed as at 108 (Fig. 14) thus angling off so that it tends to maintain and force the edge 7 over the edge 10 which is tucked thereunder.

Figure 14:
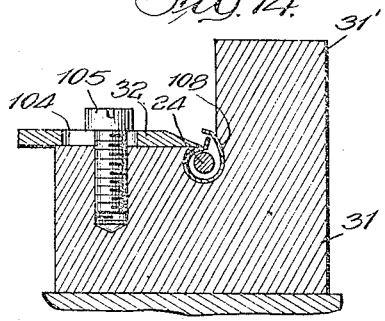
Fig. 14 is a sectional view taken substantially on line 14—14 of Fig. 3.
Figure 15:
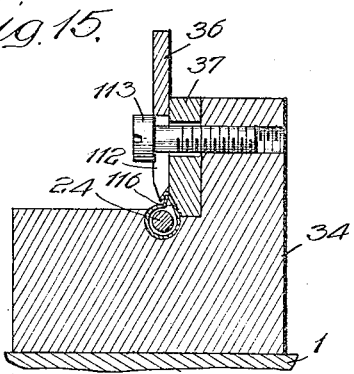
Fig. 15 is a sectional view taken substantially on line 15—15 of Fig. 3.

After being tucked under, as shown in Figures 35 and 14, the edge is turned down preferably as indicated in Figures 36 and 15 by the finger 36, 37 being a die member carried by the die 34. This finger is maintained in place by a screw 113, or equivalent means, the finger being slotted as at 112 so as to provide two finger parts 111 which are preferably formed as indicated at 114 and 115.

Figure 16:
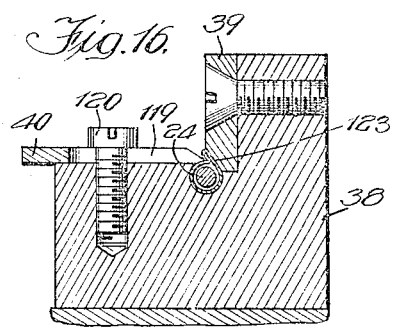
Fig. 16 is a sectional view taken substantially on line 16—16 of Fig. 3.

In the next step the edge 7 is further tucked in by the finger 40 which is maintained on the die 38 carrying the die member 39 (Figs. 16 and 37). This finger is substantially the same type as the other fingers except in a little different place and secured in place by the screw 120 or the equivalent, the same being slotted as at 119 so that it may be adjusted. The two projecting parts 118 are formed with the ends 121 and 122 which engage with the edge 7, while the cooperating die part 39 tucks or bends down and maintains the opposite side portion of the edge tight against the turned-in portion 10. The tube then presses between the rollers and the upstanding edge portions 7 and 10 and the portion of the end adjacent 7 and overlying 10 is turned down onto the mandrel so that the tube then is substantially as indicated in Figure 40 in which 4 represents the completed tube, 45 corresponds to the edge 10 and 46 corresponds with the edge 7, the tube being flush at 47, with the seam formed entirely on the inside. Not only is the tube attractive in appearance but a leak-proof seam or joint is secured.

Sometimes, and frequently, the tube as it is discharged from the machines tends to be somewhat curved, the curve being on an extremely long radius, which at times causes the tube to also be given a twist. In order to control the discharge of the tube from the machine so that the finished tube is substantially straight, I provide what may be termed a straightener, which I prefer to make adjustable so that it may be controlled as desired. In the machine shown, this consists of a straightening die or member 128 (Figs. 17—19) through which the finished tube passes. In the construction shown this is a tubular block provided with a flared mouth so that the same will fit into the die easily and also permit the adjustment of the die without bending or injuring the tube.

In the particular construction shown, 125 represents a bracket on the machine carried by the adjacent head 62. The bracket carries the support 126 provided with an opening 127 in which the die 128 is arranged, the same being slidably maintained in place by the plates 129 and 130 suitably secured to the part 126. There is also provided a plurality of adjusting members 134 which are adapted to maintain the die 128 in the desired position to produce a straight tube. As most clearly shown in Fig. 19, the die 128 is flared at the mouth, as indicated at 133, the discharge end, as indicated at 132, being substantially of a size to fit the tube. I also provide a wiper 135 (Fig. 18) arranged at the discharge end of the machine, the function of which is to wipe off the discharged tube and remove any lubricant or other particles therefrom. In the machine illustrated, when the material in the roll 3' (Fig. 1) has been drawn off and the rolls 11—12, 16—17 and 20—21 cease to work on the tube, the feeding stops and consequently it is necessary to draw off the remaining piece of material, the tube having been severed adjacent the adjustable end of the machine.

To conveniently remove the tube without readjusting the rolls, I provide a device which positively grips the tube and moves it lengthwise as the tool is operated. The particular operating mechanism shown is manually operated and includes tube grippers 142 and 143. Referring particularly to Figs. 20 to 23, a standard or base 137 is mounted on the frame of the machine and carries an operating lever or arm 138 of the desired length. This arm has two movements, to-wit, it may be swung down as indicated in Fig. 22 from its inoperative position shown in full lines and thence moved in the direction of movement of the tube, the grippers gripping the tube and causing the same to be drawn out through the forming mechanism of the machine. As illustrated, the arm is pivotally secured at 150 to a member 139 mounted on the shaft 140 carried by the ears 141. The grippers 142 and 143 are pivotally secured to the lever 138 by screws or bolts 144 or their equivalent. As shown, the free ends of the grippers may be serrated or roughened, as indicated at 145. These opposite ends are formed so as to have a limited movement, thereby limiting the movement of the tube-gripping ends. As shown, pins 149 arranged in the recess 148 provide this movement. Obviously, as the arm 138 is brought down to the position shown in Fig. 2, the free end of the lever being moved to the right (shown in Fig. 1), the tube will be gripped between the grippers 143 and 142, and as the arm is then moved, in the particular machine shown, to the left, the grippers would tend to move from the dotted line position shown in Fig. 23 to the full line position so that they grip or bite into the tube, moving the tube as the lever is moved. The arm may be moved back and forth, taking a fresh bite each time until all of the tube is removed from the machine. The contrivance is particularly convenient, as any material in the machine may be pulled through at any time while running the machine, and after the feeding action has stopped.

It was before mentioned that the tube is severed or cut at the discharge end into suitable lengths as discharged, usually of some length. In order to indicate cutting periods to produce substantially uniform lengths, I have shown a signal mechanism of simple form which will give an audible signal each time that a certain amount of material or tube has been formed and discharged. That illustrated consists of a switch consisting of the members 161 and 162 or the equivalent, forming part of an electrical circuit connected with suitable signaling mechanism, for example, a bell, buzzer, flash light or the like. The switch described is actuated periodically by a member 160. As shown, 152 represents a cam mounted on a suitable drive shaft, as for example, on the adjacent shaft 64, and arranged to rock a lever or arm 153, which is normally maintained in engagement with the cam by the spring 154 or the equivalent. The arm 153 carries a pawl 155 which is closely maintained in engagement with the ratchet wheel 156 by a spring 157 or the like, 158 being an arm for carrying the ratchet wheel and switch. Obviously, rotation of the cam rocks the arm 153 and this through the pawl causes the ratchet wheel 156 to move in a step by step movement. At each revolution of the ratchet wheel the switch is closed or controlled. Obviously, changing the arrangement of the parts, or size of the ratchet wheel, or number of teeth thereon, or the cam action, will adjustably vary the actuation of the switch to any desired intervals to indicate desired amounts of tubing discharged.

The method described and particularly when carried out by the machine described in the manner set forth produces immense quantities of tubing, all of uniform size, perfectly formed in incredibly short time, it being possible to manufacture hundreds of feet with a continuous discharge of material, or form tube travelling at high speed. The machine itself is so automatic in its operation that but a limited amount of practically unskilled labor is required. The machine may be adjusted for wear and thereby maintain a uniform product at all times. Constructed as it is, the fingers may be reground or reshaped, the material adjusted and renewed, and in case of jamming between any of the rolls the machine will automatically take care of this without injury to the machine. The machine parts may be constructed to make various sizes and shapes of tubes, the round tube being illustrative.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a tube forming machine, a driving shaft, a forming roll mounted thereon, a driven shaft operatively connected with said first-mentioned shaft and provided with a forming roll arranged to cooperate with the first-mentioned forming roll, a plurality of adjustable bearings for said driven shaft, and means cooperating with one of said bearings for regulating the position of the roll carried thereby relative to the first-mentioned roll.

2. In a tube forming machine, a driving shaft, a forming roll mounted thereon, a driven shaft operatively connected with and driven by said first-mentioned shaft and provided with a forming roll arranged to cooperate with the first-mentioned forming roll, a plurality of adjustable bearings for said driven shaft, and adjustable means cooperating with one of said bearings for regulating the position of the roll carried thereby relative to the first mentioned roll.

3. In a forming machine of the kind described, the combination of forming rolls arranged to cooperate and engage the material passing through the machine, a driven shaft carrying one of said rolls, a driving shaft carrying the other roll, means for drivingly connecting the driven shaft with said driving shaft, one shaft pivotally supported adjacent the end opposite the roll on an axis extending transversely to the axis of the shaft, whereby said roll carried thereby may be moved toward or from the opposite roll to vary the relative adjustment of the two and adjustable means for controlling the swing of said shaft, as desired.

4. In a forming machine of the kind described, the combination of forming and feeding rolls arranged to cooperate and engage the material passing through the machine, a driven shaft carrying one of said rolls, a driving shaft carrying the other roll, means for drivingly connecting the driven shaft with said driving shaft, said driven shaft pivotally supported adjacent its end opposite the roll on an axis extending transversely to the axis of rotation of the driving shaft, whereby said roll carried thereby may be moved toward or from the opposite roll to vary the relative adjustment of the two and normally unyieldable adjustable means for controlling the swing of said shaft, as desired.

5. In a tube-forming machine of the kind described and in combination, a mandrel, means for adjustably supporting the same, and a plurality of adjustable cooperating fingers arranged to fold the adjacent edges of the partially formed material passing along the mandrel.

6. In a tube-forming machine of the kind described and in combination, a plurality of dies, a mandrel extended through said dies, means cooperating with said dies and mandrel for folding the edges of partially formed material passing through the dies, adjustable fingers for positioning the edges of the material, and rolls cooperating with the mandrel for completing the forming of the tube after the same has passed said fingers.

7. In a tube-forming machine of the kind described and in combination, a mandrel about which material for making the tube is formed, means for moving the material over the mandrel, means for supporting the same, and a plurality of cooperating fingers arranged to successively fold the edges of the partially formed tube material passing along the mandrel and bring the same into interlocking engagement.

8. In a tube-forming machine of the kind described and in combination, a plurality of dies, a mandrel extended through said dies, adjustable fingers cooperating with said dies and mandrel for folding first one edge and then the other of material passing through the dies, whereby they interlock to provide a seam, and means cooperating with the mandrel for completing the forming of the seam after the same has passed said fingers.

9. In a tube-forming machine of the kind described and in combination, a plurality of dies, a mandrel extended through said dies, adjustable fingers cooperating with said dies and mandrel for folding first one edge and then the other of material passing through the dies whereby they interlock to provide a seam, and means cooperating with the mandrel for completing the forming of the seam after the same has passed said fingers and setting the same to the interior of the tube.

10. In a tube-forming machine of the kind described and in combination, a plurality of dies and adjustable fingers cooperating therewith, means for initially forming a strip of material and advancing the same through said dies, said fingers arranged to cooperate with the dies and successively tuck one edge under the opposite edge, thence bend said opposite edge over the first and thence pinch said opposite edge and body of the material to embrace the first-mentioned edge, and means including a mandrel provided with a groove therein for bending said edges inwardly of the tube to provide a lock seam substantially flush with the exterior of the tube.

11. In a tube-forming machine of the kind described and in combination, a plurality of dies and fingers cooperating therewith, means for initially forming a strip of material and advancing the same through said dies, said fingers arranged to cooperate with the dies and successively tuck one edge under the opposite edge, thence bend over said opposite edge, and thence bend said opposite edge and body of the material whereby the first-mentioned edge is interlocked therebetween and means for bending said edges projecting inwardly of the tube to provide a lock seam disposed on the interior of the tube.

12. In a tube-forming machine of the kind described and in combination, a plurality of forming rolls, a composite mandrel comprising a plurality of parts formed of metals having different characteristics and arranged with one end projecting between said rolls, and means for anchoring said mandrel and preventing lengthwise movement thereof.

13. In a tube-forming machine of the kind described and in combination, a mandrel comprising a plurality of parts and grooved lengthwise on one side and means for adjustably anchoring said mandrel and normally preventing lengthwise movement thereof; whereby the mandrel may be adjusted to compensate for wear.

14. In a tube-forming machine of the kind described and in combination, cooperating adjustable means for guiding, feeding and initially shaping a strip of material at the edges and the intermediate portion between the edges, means for successively bending the edges into interlocking engagement, and means for turning said interlocked edges into the tube whereby the formed seam lies substantially at the interior of the tube.

15. In a tube-forming machine of the kind described and in combination, means for initially forming a strip of material, means including suitable dies and cooperating fingers for bringing the edges of the partially formed tube into interlocking engagement, means for forcing the interlocked edges together inwardly whereby a lock seam is formed in the tube, and means for straightening the tube.

16. In a tube-forming machine of the kind described and in combination, mechanism comprising a plurality of independently adjustable members arranged to successively engage the moving tube material and tuck in and bend the edge portions to overlapping relation.

17. In a tube-forming machine of the kind described and in combination, feeding mechanism, mechanism comprising a plurality of independently adjustable members arranged to successively engage the moving tube material and tuck in and bend the edge portions to overlapping relation, dies for carrying the material and cooperating with said members, and means for finishing the tube passed by said members, whereby a continuously moving strip material is discharged from the machine in a continuously moving completed tube.

18. In a tube-forming machine of the kind described and in combination, mechanism comprising a plurality of independently adjustable fingers arranged to successively engage the moving tube material and fold the edge portions to overlapping and interlocking relation, dies for carrying the material and cooperating with said fingers, and means for pushing the material past said fingers, whereby a continuously moving strip material is discharged from the machine in a continuously moving completed tube.

19. In a tube-forming machine of the kind described and in combination, mechanism comprising a plurality of independently adjustable members arranged to successively engage the tube material and tuck in and bend down the edge portions to interlocking engagement.

20. In a tube-forming machine of the kind described and in combination, feeding means, mechanism comprising a plurality of independently adjustable members and dies arranged to successively engage the edges of a moving strip of partially formed tube and fold the edges into a seam, and cooperating means for completing the seam.

21. In a tube-forming machine of the kind described and in combination, mechanism comprising a plurality of independently adjustable fingers arranged to successively engage a moving strip of partially formed tube material and bend the edge portions to initially form a seam, dies for carrying the material and cooperating with said fingers, means for completing said seam, means for pushing the material past said fingers and seam completing means, whereby a strip of material fed into the machine is discharged therefrom in a continuously moving completed tube.

22. In a tube-forming machine of the kind described and in combination, a plurality of cooperating forming and feeding rolls, means for guiding a strip of material thereto, a second pair of forming rolls, guiding means arranged between said pairs of rolls guiding the partially formed material into the second pair of rolls, a third pair of forming rolls, guiding means in advance thereof for guiding and partially shaping the material fed to said third pair of rolls, a mandrel arranged in the path of the advancing material between the edges thereof, means for adjustably carrying said mandrel, a combined guide and die for partially shaping the material fed onto the mandrel, an adjustable finger for engaging one edge of the advancing material and moving the same under the opposite edge, whereby the advancing sheet loosely surrounds the mandrel, a cooperating finger for turning the opposite edge over the first edge, a third finger for turning said edge to enclose the first edge, whereby said first edge is engaged between the body of the material and the opposite edge, and a pair of rolls arranged to cooperate with each other and with the mandrel for turning said interlocking portions at the edges inwardly on the mandrel and completing the seam.

23. In a tube-forming machine of the kind described and in combination, a plurality of cooperating forming and feeding rolls, means for guiding a strip of material thereto, a second pair of forming rolls, guiding means arranged between said pairs of rolls guiding the partially formed material into the second pair of rolls, a third pair of forming rolls, guiding means in advance thereof for guiding and partially shaping the material fed to said third pair of rolls, a mandrel arranged in the path of the advancing material between the edges thereof, means for adjustably carrying said mandrel, a combined guide and die for partially shaping the material fed onto the mandrel, an adjustable finger for engaging one edge of the advancing material and moving the same under the opposite edge, whereby the advancing sheet loosely surrounds the mandrel, a cooperating finger for turning the opposite edge over the first edge, a third finger for turning said edge to enclose the first edge, whereby said first edge is engaged between the body of the material and the opposite edge, and a pair of rolls arranged to cooperate with each other and with the mandrel for turning said interlocking portions at the edges inwardly on the mandrel and completing the seam straightening means arranged for thereafter straightening the tube.

24. In a tube-forming machine of the kind described and in combination, a plurality of cooperating forming and feeding rolls, means for guiding a strip of material thereto, a second pair of forming rolls, guiding means arranged between said pairs of rolls guiding the partially formed material into the second pair of rolls, a third pair of forming rolls, guiding means in advance thereof for guiding and partially shaping the material fed to said third pair of rolls, a mandrel arranged in the path of the advancing material between the edges thereof, means for adjustably carrying said mandrel, a combined guide and die for partially shaping the material fed onto the mandrel, an adjustable finger for engaging one edge of the advancing material and moving the same under the opposite edge, whereby the advancing sheet loosely surrounds the mandrel, a cooperating finger for turning the opposite edge over the first edge, a third finger for turning said edge to enclose the first edge, whereby said first edge is engaged between the body of the material and the opposite edge, and a pair of rolls arranged to cooperate with each other and with the mandrel for turning said interlocking portions at the edges inwardly on the mandrel and completing the seam, straightening means arranged for thereafter straightening the tube, and means manually operable at will for engaging the tube and positively pulling the same through the rolls and dies.

25. In a tube-forming machine of the kind described and in combination, a plurality of cooperating forming and feeding rolls, means for guiding a strip of material thereto, a second pair of forming rolls, guiding means arranged between said pairs of rolls guiding the partially formed material into the second pair of rolls, a third pair of forming rolls, guiding means in advance thereof for guiding and partially shaping the material fed to said third pair of rolls, a mandrel arranged in the path of the advancing material between the edges thereof, means for adjustably carrying said mandrel, a combined guide and die for partially shaping the material fed onto the mandrel, an adjustable finger for engaging one edge of the advancing material and moving the same under the opposite edge, whereby the advancing sheet loosely surrounds the mandrel, a cooperating finger for turning the opposite edge over the first edge, a third finger for turning said edge to enclose the first edge, whereby said first edge is engaged between the body of the material and the opposite edge, and a pair of rolls arranged to cooperate with each other and with the mandrel for turning said interlocking portions at the edges inwardly on the mandrel and completing the seam, straightening means arranged for thereafter straightening the tube, and means manually operable at will for engaging the tube and positively pulling the same through the rolls and dies, and automatically operable means for indicating the passages of predetermined lengths of tubing through the machine.

26. In a tube-forming machine of the kind described and in combination, a plurality of cooperating forming and feeding rolls, adjustable means for guiding a flat strip of material thereto, a second pair of forming rolls, guiding means arranged between said pairs of rolls for guiding the partially formed material into the second pair of rolls, a third pair of forming rolls, guiding means in advance thereof for guiding and partially shaping the material fed to said third pair of rolls, a grooved mandrel arranged in the path of the advancing material between the up-turned edges thereof, means for adjustably carrying said mandrel, a guide in advance of the mandrel and a combined guide and die for partially shaping the material fed onto the mandrel, an adjustable member and die for engaging one edge of the advancing material and folding the same under the opposite edge, whereby the advancing sheet loosely surrounds the mandrel, a cooperating member and die for turning the opposite edge downwardly, a third member and die for turning said edge to enclose the first edge, whereby said first edge is engaged between the body of the material and the opposite edge, a plurality of rolls arranged to cooperate with each other and with the mandrel for turning said interlocking portions at the edges inwardly on the mandrel and completing the seam, straightening means arranged for straightening the tube, and manually operable means for engaging the tube at will and positively pulling the same through the rolls and dies.

27. In a device of the kind described, measuring and signalling means for the discharged tube, comprising a rotatable ratchet wheel provided with a contact member, switch members, said members arranged in proximity to one another and adapted to be temporarily brought together by contact with the contact member, in combination with an oscillating lever, a pawl carried upon the lever and adapted to rotate the ratchet wheel in a step by step movement, and means actuated by the action of the machine for oscillating said lever.

28. In a device of the kind described, means for guiding the flat ribbon into the machine, comprising suitable plates arranged in spaced relation to one another and between which the ribbon passes and is maintained in proper form to the cooperating parts, in combination with means for adjusting the guiding mechanism transversely and vertically.

29. In a device of the kind described, guide means comprising plates spaced from one another permitting the flat ribbon to pass therebetween and be maintained in suitable form, means for adjusting the position of said guiding means, and renewable wear parts carried by the guide and removably secured thereto.

30. In a device of the kind described, a shaft bearing comprising separated parts, a resilient support beneath one part of the bearing and an adjusting screw controlling the other part, in combination with a cooperating plate arranged above the bearing and carrying said screw, and resilient means maintaining the plate in normal position.

31. In a device of the kind described, pulling mechanism arranged at the discharge end of the machine comprising a lever mounted to permit its free end to oscillate transversely to its support and also to be oscillated transverse the length of the lever, in combination with gripping members carried by the lever and arranged to receive a tube therebetween and grip the same, whereby the tube may be withdrawn from the machine.

32. In a device of the kind described, pulling mechanism comprising an oscillating lever mounted to permit the free end to be oscillated in a plane transverse to its support, and also be oscillated in a plane transverse to the lever, in combination with gripping members carried by the lever arranged to receive a tube therein, whereby the movement of the lever in one direction will serve to engage and permit the tube to be pulled from the machine, and the reverse movement of the lever will cause the gripping members to open and permit the members to move backward on the tube to secure a new hold.

33. In a device of the kind described, bending mechanism for the seam comprising a finger 32 adapted to push one edge of the tube material beneath the other edge, in combination with a cooperating finger 36 arranged to bend down the uppermost edge upon the first, a third finger arranged to push the bent-over portion downward to embrace the first edge, and means for rolling the seam thus formed to complete the seam.

34. In a device of the kind described, tube-bending means comprising a bending finger 32 arranged to push one edge of the tube material beneath the cooperating other edge, in combination with a cooperating finger 36 arranged to bend the uppermost edge downward upon the first, a third finger arranged to press the downward bending upper edge upon the first edge, and means for rolling the parts down to form a seam, one or more of said fingers being adjustable in relation to their positions.

35. In a tube-forming machine of the kind described and in combination, a mandrel, means for supporting the same, means for moving the material of the tube over the mandrel, and a plurality of oppositely disposed cooperating fingers arranged to fold the edges of the material as it is moved over the mandrel, the fingers being adjustable toward or away from each other.

36. In a tube-forming machine of the kind described power-driven means for advancing the tube, manually operated means comprising a lever mounted so that it may be angularly displaced in planes normal to each other, and pivoted members carried by said lever for gripping the tube.

In testimony whereof, I have hereunto signed my name.

CHARLES D. DALLAS.